United States Patent [19]

Tamamaki et al.

[11] Patent Number: 5,190,567
[45] Date of Patent: Mar. 2, 1993

[54] SINTERED ALUMINOUS ABRASIVE GRAINS AND METHOD OF PRODUCING THE SAME

[75] Inventors: Masahiro Tamamaki; Yoshihiro Onoda; Masaru Nozaki; Naruo Suzuki, all of Osaka, Japan

[73] Assignee: Japan Abrasive Co., Ltd., Osaka, Japan

[21] Appl. No.: 653,313

[22] Filed: Feb. 11, 1991

[30] Foreign Application Priority Data

Feb. 9, 1990 [JP] Japan .................................. 2-30427

[51] Int. Cl.$^5$ .............................................. C09C 1/68
[52] U.S. Cl. ........................................ 51/293; 51/298; 51/309; 423/600; 501/127
[58] Field of Search ................ 51/293, 298, 309; 501/127; 423/600

[56] References Cited

U.S. PATENT DOCUMENTS

| | | |
|---|---|---|
| 4,518,397 | 5/1985 | Leitheiser et al. ................ 51/309 |
| 4,645,561 | 2/1987 | Kea ........................................ 51/309 |
| 4,657,754 | 4/1987 | Bauer et al. ........................ 501/127 |
| 4,704,266 | 11/1987 | Kadokura et al. ................ 423/600 |
| 4,741,743 | 5/1988 | Narayanan et al. ................ 51/309 |
| 4,744,802 | 5/1988 | Schwabel ............................ 51/309 |
| 4,786,292 | 11/1988 | Janz et al. ............................ 51/309 |
| 4,799,938 | 1/1989 | Janz et al. ............................ 51/293 |
| 4,946,664 | 8/1990 | Van Zyl et al. .................... 423/600 |
| 4,954,462 | 9/1990 | Wood et al. ........................ 501/127 |

*Primary Examiner*—Mark L. Bell
*Assistant Examiner*—Willie J. Thompson
*Attorney, Agent, or Firm*—Wenderoth, Lind & Ponack

[57] ABSTRACT

Sintered aluminous abrasive grains having a density of at least 95% of theoretical density and having an alpha alumina crystal size of smaller than one micron. Which are obtained by drying and crushing a lithium containing alumina dispersion and sintering the crushed objects at 1100°-1500° C., said abrasive grains have the strength and hardness equal to or higher than conventional abrasive grains, superior properties in grinding resistance and wear resistance and superior self-sharpening property in course of grinding.

12 Claims, No Drawings

1

SINTERED ALUMINOUS ABRASIVE GRAINS AND METHOD OF PRODUCING THE SAME

BACKGROUND OF THE INVENTION

1. Field of the Invention

This invention relates to a sintered aluminous abrasive grain and a method of producing the same used for grinding wheel, coated abrasive, lapping composition used for lapping and so forth.

2. Prior Arts

Conventionally there have been provided a method for producing a sintered aluminous abrasive grain wherein alumina containing materials such as bayer alumina powder, bauxite powder and so forth are formed into particles with a binder and then sintered at a high temperature of 1600° C. or higher. Another method has been also provided wherein alumina monohydrate used as a raw material is treated by a sol-gel process and sintered at a low temperature of 1500° C. or lower. The former method produces abrasive grains including alpha alumina of a large crystal size such as 3–10 microns and consequently the application thereof is limited to heavy duty grinding. The latter method produces abrasive grains having a crystal size of alpha alumina below 2 microns.

Japanese patent application laid open under No. 56-32369 whose related U.S. patent applications Ser. No. 53,347 and Ser. No. 145,383 are patented under U.S. Pat. No. 4,314,827 discloses a sintered alumina abrasive grain produced from a substantially calcium ion- and alkali metal ion-free alumina monohydrate by a sol-gel process. In this technology, at least one modifying component is added into a colloidal dispersion of alumina. The modifying component is added in a form of salt. Proposed for the modifying component is at least 10 vol % of zilconia and/or hafnia and at least 1 vol % of spinel derived from alumina and at least one oxide of a metal selected from cobalt, nickel, zinc, or magnesium.

Japanese patent application laid open under No. 57-20762 which is related to U.S. patent applications Ser. No. 267,495 and 330,123 discloses a sintered abrasive grain from a sol-gel process which is characterized in that sodium and calcium are contained in the grain.

Japanese patent application laid open under No. 60-231462 whose related U.S. patent application Ser. No. 572,106 is patented under U.S. Pat. No. 4,623,364 discloses a sintered alumina abrasive grain from a sol-gel process wherein seed crystal of alpha alumina is used. Namely, alpha alumina particles of submicron size are mixed as a nucleator into a dispersion of hydrate alumina particles in order to lower a transition temperature of a gel alumina from gamma form to alpha form. Also disclosed is that source compounds for Si, Cr, Mg and Zr may be added to a gel as grain growth inhibitors. In short, dense alpha alumina crystal particles are obtained by adding alpha alumina particles of submicron size as a nucleator and thereby permitting the manufacture by low temperature sintering.

Japanese patent application laid open under No. 63-97681 discloses a sintered alumina abrasive grain from a sol-gel process obtained by vacuum degassing of a sol. It is required that occluded air in a suspension shall be removed and further aggregation particles shall be removed from the suspension. It is described that the addition of particle growth inhibitors such as Mg, Ca, Co, Si etc. shows no effect. In short this invention provides dense abrasive grains by removing occluded air in the suspension and removing the aggregation particles from the suspension and thereby forming alpha alumina nuclei at 1000° C.

The modifying component added in the form of salt in the above mentioned Japanese patent application laid open under No. 56-32369 has an effect to accelerate gelation, as a result the addition into the colloidal dispersion causes rapid gelation and results in remarkable increase of viscosity. Consequently uniform mixture of the modifying component is difficult and uniform dispersion of composition can not be attained. As a result nonuniform portion is produced, which results in low grinding efficiency. Sintering temperature for abrasive grains is at least 1250° C. but not above the melting point. Accordingly, in order to obtain a superior grinding efficiency, it is inevitable that alumina component must be of complete alpha alumina crystal.

Japanese patent application laid open under No. 57-20762 discloses that the abrasive grains obtained from a sol-gel process have superior efficiency than conventional fused alumina abrasive grains even if the grains contain sodium which is usually contained as an impurity in alumina raw materials and calcium which is contained in water as an impurity. Namely, the effect of intentional addition of alkaline metal elements such as sodium and calcium is not recognized.

In accordance with the method of Japanese patent application laid open under No. 60-231462, huge crystal particles are present in addition to the crystal particles of submicron size. It is construed that said huge crystal particles are caused from nucleator, because nucleator inevatably includes large alpha alumina particles in addition to alpha alumina particles of submicron size even if most careful attention is paid. Further smallest particles of alpha alumina particles of submicron size are larger than alpha alumina crystal nuclei formed in a gel at about 1000° C., so that nonuniform growth of crystal particles is caused.

In the method disclosed in the Japanese patent application laid open under No. 63-97681, the nucleation of alpha alumina takes place at random so that the crystal of alpha alumina becomes nonuniform. This invention also intends to obtain a complete alpha alumina crystal at a low temperature by lowering the transition temperature of alumina to alpha alumina crystal.

SUMMARY OF THE INVENTION

It is therefore an object of the present invention to provide a sintered aluminous abrasive grain having the strength and hardness equal to or high than conventional grains, having a uniform and fine alpha alumina crystal structure, having superior properties in grinding resistance and wear resistance and having superior self-sharpening property in course of grinding.

The present invention also intends to provide a method for producing said abrasive grain in an efficient and stable manner.

In order to attain the above objects, we have developed a novel technology for producing the sintered aluminous abrasive grain which is completely different from prior technology for developing the sintered aluminous abrasive grain from a sol-gel process. Prior sol-gel processes for obtaining a sintered aluminous abrasive grain intend to minimize the alpha alumina crystal size as fine as possible and besides intend to obtain a sintered complete alpha alumina which has high strength and high hardness. To the contrary, we have found that it is possible to provide an abrasive grain having the strength and hardness equal to or higher than conventional abrasive grains, having superior properties in grinding resistance and wear resistance and besides having superior self-sharpening property by making the alpha alumina crystal structure uniform and fine as well as controlling an alpha alumina crystallization ratio. In accordance with this finding, the present invention is accomplished as follows.

Namely, the present invention provides a sintered aluminous abrasive grain of a uniform and fine crystal structure containing an aluminum oxide having the purity of higher than 98.0 wt % and a lithium oxide of 0.01–1.5 wt %, having a density of at least 95% of theoretical density and having an alpha alumina crystal size of smaller than one micron. Said sintered aluminous abrasive grain has the alpha alumina crystallization ratio of 75–95% which is different from the sintered alumina abrasive grains from prior sol-gel processes wherein it is intended to obtain a complete alpha alumina crystal structure.

Said sintered aluminous abrasive grain provided in accordance with the present invention can be produced by providing a dispersion comprising water, alumina monohydrate, lithium precursor and acid, drying and crushing said lithium containing dispersion and sintering the crushed object at a temperature of 1100° C.–1500° C.

DETAILED DESCRIPTION OF THE INVENTION

Namely, we have found that sintered aluminous abrasive grain of high density and having uniform and fine crystal structure can be obtained by the presence of lithium element in an alumina dispersion. This process requires no spinel components, no alpha alumina seed crystals and no complicated treatment such as vacuum degassing. In the presence of lithium elements, dried gel of the alumina dispersion initiates the transition of alumina from theta form to alpha form at about 1000° C. which is about over 150° C. lower than a transition temperature of a regular alumina hydrate from theta form to alpha form. Because lithium acts as a nucleus which accelerate the transition of alumina from theta form to alpha form and thereby the sintered aluminous abrasive grain having dense, uniform and fine crystal structure is obtained.

In general, when alkali metal elements, especially sodium and potassium is included in alumina, beta alumina is induced so that a mechanical property, i.e. strength of grain deteriorates. In the case of lithium, however, the deterioration of the mechanical strength is not experienced when the additive amount is in the range of 0.01–1.5 wt %. The deterioration of the mechanical strength is not also experienced when such additives are mixed into the lithium containing alumina dispersion as grain growth inhibitors of alumina, alpha alumina crystal particles for lowering the transition temperature and source compounds for Mg, Ca, Co, Ni, Cr, Fe, Si, Zn, Mn, Ti and Zr for upgrading the toughness of the grains.

We have found that alpha alumina crystallization ratio influences greatly grinding properties. The alpha alumina crystallization ratio of the grain crystal obtained as above is 75–95%. Controlling the crystallization ratio within said range, there can be provided abrasive grains having the strength and hardness equal to or higher than conventional grains, superior properties in grinding resistance and wear resistance and superior self-sharpening property which can not be expected in conventional grains.

Cutting edge wear and self-sharpening property of abrasive grains in course of grinding are generally considered as follows. A cutting edge is very sharp at first. During consecutive grinding, the cutting edge of grains is gradually worn flatly due to work resistance and heat generation therefor, so that the cutting edge becomes dull. When the cutting edge becomes dull, the grinding resistance is increased so as to crush the grain at cleavage planes of the crystal or cracked portions, and thereby new cutting edge is formed at the crushed plane. This is so-called self-sharpening property. Conventional abrasive grains being of complete alpha alumina crystal, the grain strength is high so that heat generation is increase in cource of grinding and grinding resistance is high. As a result a dull cutting edge is crushed greatly and consequently grain wear is increased.

We have found the correlation between alpha alumina crystallization ratio of abrasive grains having uniform and fine alpha alumina crystal structure having a crystal size of less than one micron and the grinding resistance as well as wear resistance of the abrasive grains, and that superior results can be obtained when the crystallization ratio is 75–95%.

When the alpha alumina crystallization ratio is less than 75%, grinding resistance is low but the abrasive grains wear greatly. When the crystallization ratio is higher than 95%, the grinding resistance is increased remarkably, and the grains wear greatly because the grains are crushed greatly at the time of reproduction of the cutting edge. In case the alpha alumina crystallization ratio is 75–90%, more preferably 80–90%, the reproduction of cutting edge is performed with the alpha alumina crystal size. Accordingly, the grinding resistance is low and stable and the grain wear is extremely decreased. As a result superior self-sharpening property is enjoyed.

It is necessary for alpha alumina crystal size to be smaller than one micron. When the crystal size is larger than one micron, the grinding resistance and the grain wear are increased even if alpha alumina cristallization ratio is 75–95%.

The alpha alumina crystallization ratio herein mentioned is valued by measuring X-ray diffraction intensity at five diffraction angle of one background and four peak by a step-scan method with the measuring time of ten seconds using a X-ray diffractometer.

Measuring conditions are as follows.

| target Cu | tube voltage | 40 kV |
|---|---|---|
| monochromater | tube current | 25 mA |
| divergency slit | | 1 deg |
| receiving slit | | 0.6 mm |
| step width | | 0.01 deg |
| measuring time | | 10 sec |
| detector | | S.C. |
| background | $2\Theta = 58.50°$ | |
| peak [hkl = (116)] | $2\Theta = 57.50°$ | |
| | $2\Theta = 57.48°$ | |
| | $2\Theta = 57.46°$ | |
| | $2\Theta = 57.44°$ | |

Calculation is made as follows. First, mean value of three peak values, i.e. highest peak value and two peak values at the diffraction angle before and after that of the highest peak value is obtained. Then "Net X-ray intensity" is obtained by reducing the background value from the mean value. Finally, using a calibration graph showing the relation between alpha alumina crystallization ratio and Net X-ray intensity which has been prepared using standard samples, alpha alumina crystallization ratio is obtained from the Net X-ray intensity.

Said standard samples are prepared as follows.

[alpha alumina crystallization ratio (%)]
 0%: colloidal dispersion was maintained in a electric furnace at 700° C. for twenty hours
 100%: standard sample of 0% crystallization ratio is maintained in a electric furnace at 1400° C. for four hours
 50%: standard samples of 0% and 100% crystallization ratio are mixed with each 100 g When alumina sol concentration is high or grain growth inhibitors are added in the dispersion in course of preparation of colloidal dispersion, viscosity increase occurs so that it is difficult to obtain a uniform dispersion. But we have found that viscosity of the colloidal dispersion is decreased extremely when dispersion temperature is kept higher than 40° C. and thereby a uniform dispersion can be easily obtained. When the dispersion thus obtained is subjected to a ultrasonic treatment, sintered alumina abrasive grain having more dense, uniform and fine crystal structure can be obtained.

The sintered aluminous abrasive grain obtained in accordance with the present invention can be used for a lapping compound employed in lapping. When the grains are bonded with an inorganic bond and calcined at a temperature lower than 1400° C. or bonded with an organic bond and calcined at a temperature lower than 250° C, grinding wheel and grinding disc can be obtained. When a resinoid bond is used and calcined at a temperature lower than 250° C., coated abrasive articles can be obtained.

Now, the method of producing the sintered aluminous abrasive grain in accordance with the invention is described herein in detail in order of manufacturing process.

1. Preparation of Colloidal Dispersion

Colloidal dispersion is prepared by mixing water, alumina source, lithium source, acid and optionally modifying component with each other.

Mixing is performed using a well-known mixer or mill such as vibromill, ball mill, homogenizer etc. It is preferred to apply a lining in order to avoid the inclusion of impurities originated from a crushing means. Balls are preferably coated with polytetrafluoroethylene and the like. Water to be used is not necessarily limited, but ion exchange water is preferred in order to obtain a high quality of water. Of course, the inclusion of contaminant shall be avoided as much as possible.

Alumina materials are selected from alumina monohydrate, psuedo-Boehmite and amorphous alumina monohydrate, which are commercially available under the trade designation of "Pural" and "Disperal" produced by Condea Chemie GMBH and "Catapal" produced by Vista Chemical Company.

For a lithium source, lithium precursor such as water soluble lithium nitrate, lithium chloride is preferred. The lithium content in the product is 0.01-1.5 wt % in a form of oxide. Less content than 0.01 wt % is ineffective. Higher content than 1.5 wt % causes the reduction of mechanical strength and is not preferred from the economical point of view. More preferrable content of lithium is 0.03-0.15 wt % in the form of oxide.

Acids used as a deflocculant include nitric, hydrochloric, acetic acid and mixed acid thereof. The amount of acids is determined so that a pH value of the dispersion become 2-4.

Alumina grain growth inhibitors and modifying components such as Mg, Co, Ni, Cr, Fe, Si, Zn, Mn, Ti and Zr sources for the improvement of toughness are preferred to be water soluble compounds. Solid content of the colloidal dispersion can be controlled within the range of 5-40 wt %. When mixing is made with a high solid content, particularly with the content of higher than about 20 wt %, viscosity of dispersion is increased so that uniform dispersion is difficult. But the viscosity drops when the dispersion is made at a temperature higher than about 40° C., so that the preparation of uniform dispersion is easy. When the temperature is higher than 100° C., rapid evaporation of solvent occurs and consequently a mixer of pressure resistance is required. 40°-80° C. is then preferred.

Some of alumina materials is less dispersible. In this case, nondispersive particles may be removed using a classifier such as hydro-cyclon to obtain high quality of products.

In case sintered abrasive grains having extremely fine crystal structure is desired as a final product, the dispersion obtained as above may be further treated with a ultrasonic vibration. Ultrasonic vibration activates every particles in the dispersion by giving a large energy, so that a lower temperature is applicable in sintering.

2. Drying, Crushing, Classifying of the Dispersion

Lithium containing dispersion is dried to obtain a glass-like solid material, i.e. dried gel. The dried gel obtained is then crushed and classified into desired grades. Drier may be any type of drying apparatus such as hot-air drying machine and vacuum drying machine. The dispersion is spread with a thickness of a few centimeters on a stainless steel bat and is dried statically at a temperature lower than 150° C. to remove water completely. A dispersion of high viscosity may be extruded in a desired shape using a extruding machine or other general forming machine and is dried at a temperature lower than 150° C. Higher temperature than 150° C. is not preferable because the dried gel of undesired particle size can not be dispersed again. Lower a drying temperature is, higher the density of grains. Practical temperature shall be decided in view of productivity. Apart from the temperature and pressure, drying shall be made under the conditions that no bubbles occur in the dispersion.

Crushing is made until a desired particle size is obtained by a well known crushing device such as a roll crusher, ball mill or impellar breaker.

Classifying may be made by a wire mesh screen such as a vibration sifter and particles of undesired size are returned to the initial process for preparing the colloidal dispersion.

3. Sintering

Sintering is performed by any kinds of furnace such as a rotary kiln, muffle furnace or tunnel furnace. Before sintering, classified grains are calcined at a temperature of 500°-600° C. to remove water of crystallization and acids. Sintering temperature is preferred to be 1100°-1500° C. When the sintering temperature is lower than 1100° C., alpha alumina crystallization ratio is low and then the strength of the grain is weak. In case the temperature exceeds 1500° C., conversion to alpha alumina crystal is too much accelerated. Then alpha alumina crystal size is over two microns and alpha alumina crystallization ratio exceeds 100% of the standard sample. Heating or cooling rate and keeping time are not limited. It is preferred to take a long keeping time when sintering is performed at a low temperature, and a short keeping time at a high temperature. Selection may be usually made within the range of 10 minutes to 2 hours. Sintering is preferred to be performed in a non-reducing atmosphere. When sintering is performed by a batch furnace, the thickness of grain is preferred to be less than 20 mm.

Sintered aluminous abrasive grains obtained in accordance with the present invention have a dense, uniform and fine crystal structure having a particle size of below one micron and a density of over 95% of theoretical density by the reason of the presence of lithium elements. Since alpha alumina crystallization ratio is controlled within the range of 75-95%, there can be provided sintered aluminous abrasive grains having the strength and hardness equal to or higher than conventional grains and superior grinding properties in grinding resistance, wear resistance and self-sharpening property in course of grinding.

It goes without saying that lapping composition, grinding wheel, grinding disc or coated abrasive articles using the sintered aluminous abrasive grains also show superior grinding properties.

The method for producing the sintered aluminous grains in accordance with the present invention comprising preparing a lithium containing colloidal dispersion, drying, crushing and sintering the crushed objects at 1100°-1500° C. can provide desired sintered aluminous abrasive grains very efficiently and in a stable manner, because it is not required to use spinel, to mix alpha alumina crystal in the dispersion or to perform a complicated treatment such as vacuum degassing as is the case of the prior sol-gel processes.

EXAMPLES

Example 1

Catapal alumina presented by Vista Chemical Company as alumina source, lithium nitrate($LiNO_3$) as lithium source, magnesium nitrate($Mg(NO_3)_2 \cdot 6H_2O$) as alumina modifying component, AKP-53 presented by Sumitomo Chemical Co., Ltd. as alpha alumina particles, concentrated nitric acid(61%) as deflocculant and ion exchange water are used to prepare the compositions as shown in Table 1.

Said compositions were charged into a stainless steel pot mill coated with polytetrafluoroethylene and mixed for 24 hours using steel balls coated with polyurethane as a crushing means to obtain a colloidal dispersion. Temperature was 25°±3° C. for sample Nos. 1-9, 11-16 and sample Nos. 17-25 of comparative examples in Table 2. Sample No. 10 was 50°±3° C. Temperature control was conducted by utilizing an air conditioner and heating the outside of stainless steel pot with an infrared lump.

pH value and viscosity of the dispersions obtained are as shown in Table 1 and Table 2. pH value was all in the range of 3.0-3.5. The viscosity of the sample No. 10 prepared at 50° C. was 1800 cp which is about ⅓ of other dispersions. Sample No. 9 was treated with a ultrasonic cleaning machine for 30 minutes at 40 kHz, 600 W.

Each dispersion was then spread in a stainless steel tray with the thickness of 2-3 cm and dried with a hot-air drying machine for 24 hours at 80° C. to obtain glass like material i.e. dried gel. Said dried gel was crushed repeatedly with a roll crusher until the particle size becomes below 0.5 mm. Crushed objects thus obtained were classified into 0.5-0.18 mm using a vibration sifter. Undesired fine particles of below 0.18 mm could be dispersed again.

Each classified particle was then inserted into a crucible made of alumina (purity 98%) with the thickness of 15 mm and calcined at 500° C. for 12 hours at a heating rate of 5° C./min. in an oxidizing atmosphere using an electric furnace and thereby water of crystallization and nitric acid ion were removed. Then sintering was performed at a heating rate of 10° C./min. at the temperature and for the keeping time as shown in Table 1.

The composition of sintered abrasive grains thus obtained, alpha alumina crystallization rate, relative density, alpha alumina crystal size, knoop hardness (knoop indenter, 100 g load), strength per grit(#60) and mineral composition are as shown in Table 1.

In sample Nos. 1-16, alpha alumina crystallization rate was within the range of 70-95% respectively and the relative density was over 95%. Alpha alumina crystal size was below one micron which was 1/16-½ of comparison examples. Knoop hardness was over 1850 kpf/mm². Strength per grit was equal to comparative examples. As to mineral composition, alpha alumina (corundum) was observed in sample Nos. 1-4 and 7-16. Alpha alumina and $LiAl_5O_8$ were observed in sample Nos. 5 and 6.

In sample No. 21 of comparative example, crystal size is small, relative density is low and knoop hardness is low. In sample No. 22, the keeping time in sintering is long compared with that in sample Nos. 12, 13 and 14, and alpha alumina crystallization rate is over 95%. In sample No. 23, the sintering temperature is 50° C. higher than sample No. 14 and the keeping time is longer than sample No. 15, and then the crystallization rate is over 95%.

TABLE 1

| | Sample No. | \multicolumn{16}{c}{EMBODIMENTS} |
| --- | --- | --- | --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 12 | 13 | 14 | 15 | 16 |
| Composition | ion exchange water (l) | 40 | 40 | 40 | 40 | 40 | 40 | 40 | 40 | 40 | 40 | 40 | 40 | 40 | 40 | 40 | 40 |
| | Catapal alumina (kg) | 8 | 8 | 8 | 8 | 8 | 8 | 8 | 8 | 8 | 8 | 8 | 8 | 8 | 8 | 8 | 8 |
| | $LiNO_3$ (g) | 2.6 | 7.8 | 25.9 | 38.8 | 259 | 387.6 | 7.8 | 7.8 | 7.8 | 7.8 | 13 | 13 | 13 | 13 | 13 | 13 |
| | $Mg(NO_3)_2 6H_2O$ (g) | 0 | 0 | 0 | 0 | 0 | 0 | 18.8 | 0 | 0 | 0 | 0 | 0 | 0 | 0 | 0 | 0 |
| | alpha alumina particles | 0 | 0 | 0 | 0 | 0 | 0 | 0 | 56 | 0 | 0 | 0 | 0 | 0 | 0 | 0 | 0 |
| | $HNO_3$ (ml) | 700 | 700 | 700 | 700 | 700 | 700 | 700 | 700 | 700 | 700 | 700 | 700 | 700 | 700 | 700 | 700 |
| Condition | mixing temperature (±3° C.) | 25 | 25 | 25 | 25 | 25 | 25 | 25 | 25 | 25 | 25 | 25 | 25 | 25 | 25 | 25 | 25 |
| | ultrasonic vibration | — | — | — | — | — | — | — | — | ○ | — | — | — | — | — | — | — |

TABLE 1-continued

| | Sample No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Dispersion | viscosity (cP) | 4500 | 4500 | 4550 | 4400 | 4450 | 4500 | 4800 | 4500 | 4500 | 1800 | 4550 | 4550 | 4550 | 4550 | 4550 | 4550 |
| | pH | 3.3 | 3.3 | 3.3 | 3.4 | 3.2 | 3.3 | 3.2 | 3.4 | 3.0 | 3.4 | 3.3 | 3.2 | 3.3 | 3.2 | 3.3 | 3.2 |
| Sintering | sintering temperature (°C.) | 1350 | 1350 | 1350 | 1350 | 1350 | 1350 | 1350 | 1350 | 1350 | 1350 | 1100 | 1350 | 1350 | 1350 | 1400 | 1500 |
| | keeping time (min.) | 30 | 30 | 30 | 30 | 30 | 30 | 30 | 30 | 30 | 30 | 120 | 20 | 60 | 120 | 60 | 5 |
| Sintered body | components (%) $Al_2O_3$ | 99.6 | 99.6 | 99.5 | 99.5 | 98.7 | 98.2 | 99.5 | 99.6 | 99.6 | 99.6 | 99.5 | 99.5 | 99.5 | 99.5 | 99.5 | 99.5 |
| | $Li_2O$ | 0.01 | 0.03 | 0.1 | 0.15 | 1.0 | 1.5 | 0.1 | 0.03 | 0.03 | 0.03 | 0.05 | 0.05 | 0.05 | 0.05 | 0.05 | 0.05 |
| | MgO | 0 | 0 | 0 | 0 | 0 | 0 | 0.05 | 0 | 0 | 0 | 0 | 0 | 0 | 0 | 0 | 0 |
| | alpha alumina crystallization rate (%) | 78 | 80 | 85 | 86 | 90 | 93 | 84 | 93 | 90 | 90 | 80 | 79 | 82 | 90 | 87 | 88 |
| | alpha alumina crystal size ($\mu$) | <0.3 | <0.3 | <0.5 | <0.5 | <0.9 | <0.9 | <0.8 | <1 | <0.3 | <0.3 | <0.5 | <0.4 | <0.3 | <0.6 | <0.5 | <0.5 |
| | relative density (%) | 97.5 | 99.2 | 99.4 | 99.0 | 96.2 | 95.4 | 98.5 | 98.8 | 99.6 | 99.6 | 99.6 | 99.3 | 99.2 | 98.7 | 98.9 | 99.5 |
| | knoop hardness (kg/mm²) | 900 | 1950 | 2000 | 2000 | 1900 | 1900 | 1850 | 2000 | 2100 | 2100 | 1900 | 2050 | 2100 | 2050 | 2000 | 2000 |
| | strength per grit (kg/piece) | 2.3 | 2.5 | 2.6 | 2.8 | 2.5 | 2.5 | 2.4 | 2.3 | 3.0 | 3.0 | 2.3 | 2.6 | 2.8 | 2.6 | 2.5 | 2.5 |
| | mineral component (X-ray diffraction)* | C | C | C | C | C, LA | C, LA | C | C | C | C | C | C | C | C | C | C |

*C: $\alpha$-$Al_2O_3$  LA: $LiAl_5O_8$

TABLE 2

| | | Sample No. | COMPARATIVE EXAMPLES | | | | | | | | |
|---|---|---|---|---|---|---|---|---|---|---|---|
| | | | 17 | 18 | 19 | 20 | 21 | 22 | 23 | 24 | 25 |
| Composition | ion exchange water (l) | | 40 | 40 | 40 | 40 | 40 | 40 | 40 | 40 | 40 |
| | Catapal alumina (kg) | | 8 | 8 | 8 | 8 | 8 | 8 | 8 | 8 | 8 |
| | $LiNO_3$ (g) | | 0 | 516.8 | 0 | 0 | 13 | 13 | 13 | 13 | 13 |
| | $Mg(NO_3)_2 6H_2O$ (g) | | 0 | 0 | 18.8 | 0 | 0 | 0 | 0 | 0 | 0 |
| | alpha alumina particles | | 0 | 0 | 0 | 56 | 0 | 0 | 0 | 0 | 0 |
| | $HNO_3$ (ml) | | 700 | 700 | 700 | 700 | 700 | 700 | 700 | 700 | 700 |
| Condition | mixing temperature (±3° C.) | | 25 | 25 | 25 | 25 | 25 | 25 | 25 | 25 | 25 |
| | ultrasonic vibration | | — | — | — | — | — | — | — | — | — |
| Dispersion | viscosity (cP) | | 4400 | 4800 | 4800 | 4400 | 4550 | 4550 | 4550 | 4550 | 4550 |
| | pH | | 3.3 | 3.3 | 3.3 | 3.4 | 3.2 | 3.3 | 3.2 | 3.4 | 3.3 |
| Sintering | sintering temperature (°C.) | | 1350 | 1350 | 1350 | 1350 | 1050 | 1350 | 1400 | 1400 | 1500 |
| | keeping time (min.) | | 30 | 30 | 30 | 30 | 240 | 240 | 120 | 240 | 30 |
| Sintered body | components (%) | $Al_2O_3$ | 99.6 | 97.7 | 99.5 | 99.6 | 99.5 | 99.5 | 99.5 | 99.5 | 99.5 |
| | | $Li_2O$ | 0 | 2 | 0 | 0 | 0.05 | 0.05 | 0.05 | 0.05 | 0.05 |
| | | MgO | 0 | 0 | 0.05 | 0 | 0 | 0 | 0 | 0 | 0 |
| | alpha alumina crystallization rate (%) | | 90 | 95 | 94 | 95 | 70 | 97 | 96 | 100 | 98 |
| | alpha alumina crystal size ($\mu$) | | <4 | <5 | <2 | <2 | <0.3 | <1 | <1 | <2 | <3 |
| | relative density (%) | | 87.5 | 91.4 | 93.2 | 98.0 | 90.2 | 98.7 | 99.8 | 99.8 | 99.0 |
| | knoop hardness (kg/mm²) | | 1300 | 1850 | 1850 | 1900 | 1700 | 1900 | 2000 | 2050 | 2000 |
| | strength per grit (kg/piece) | | 1.8 | 2.2 | 2.2 | 2.3 | 2.0 | 2.4 | 2.5 | 2.5 | 2.5 |
| | mineral component (X-ray diffraction) | | C | C,LA | C | C | C | C | C | C | C |

*C: $\alpha$-$Al_2O_3$  LA: $LiAl_5O_8$

EXAMPLE 2

Abrasive grains of particle size #80 were obtained by siftering sample Nos. 1, 2, 6, 8, 9, 11, 12, 14 and 16 of the embodiments according to the present invention as well as sample Nos. 17, 19, 20, 21 and 24 in comparative examples. Vitrified wheels of type 1A, 200×10×31.75 mm were obtained by applying a vitrified bond of low melting point to the abrasive grains and sintering the same at 900° C. For purpose, vitrified wheels were prepared in a like manner using conventional fused alumina abrasive grains. Works SUJ-2 (hardening steel) were ground using the horizontal spindle surface grinding machine PSG-52A of OKAMOTO and the results are as shown in Table 3.

Vitrified wheels using embodiment grains showed about four times the grinding ratio of conventional wheels both in dry grinding and wet grinding. Grinding resistance being low, no burn mark and no chatter mark were observed.

EXAMPLE 3

Abrasive grains of particle size #60 were obtained by siftering sample Nos. 2, 7, 10, 13 and 15 in embodiments and sample Nos. 19, 20, 21 and 24 in comparative examples. Resinoid grinding discs were obtained by applying a phenolic resin bond to the abrasive grains and sintering the same at 180° C. For comparison purpose, resinoid grinding discs were prepared in a like manner using conventional fused alumina abrasive grains and fused alumina zirconia abrasive grains. Works S45C (38×500×10 mm) were ground using HITACHI PDH-180B with 4 kg load for 20 minutes. Total stock removal is as shown in Table 4.

TABLE 3

| Vitrified grinding wheel | Dry grinding | | | Wet grinding | | |
|---|---|---|---|---|---|---|
| | grinding ratio (mm³/mm³) | grinding resistance (kgf/mm) | | grinding ratio (mm³/mm³) | grinding resistance (kgf/mm) | |
| | | Fn | Ft | | Fn | Ft |
| sample No. 1 | 48 | 0.3 | 0.1 | 62 | 0.5 | 0.2 |

TABLE 3-continued

| Vitrified grinding wheel | Dry grinding | | | Wet grinding | | |
| --- | --- | --- | --- | --- | --- | --- |
| | grinding ratio (mm³/mm³) | grinding resistance (kgf/mm) | | grinding ratio (mm³/mm³) | grinding resistance (kgf/mm) | |
| | | Fn | Ft | | Fn | Ft |
| sample No. 2 | 50 | 0.4 | 0.2 | 64 | 0.6 | 0.2 |
| sample No. 6 | 45 | 0.5 | 0.2 | 56 | 0.7 | 0.3 |
| sample No. 8 | 48 | 0.5 | 0.2 | 58 | 0.7 | 0.2 |
| sample No. 9 | 53 | 0.3 | 0.1 | 70 | 0.3 | 0.1 |
| sample No. 11 | 52 | 0.3 | 0.1 | 65 | 0.3 | 0.1 |
| sample No. 12 | 53 | 0.3 | 0.1 | 66 | 0.3 | 0.1 |
| sample No. 14 | 50 | 0.4 | 0.1 | 58 | 0.4 | 0.2 |
| sample No. 16 | 52 | 0.3 | 0.1 | 60 | 0.3 | 0.1 |
| sample No. 17 | 5 | 0.3 | 0.1 | 5 | 0.3 | 0.1 |
| sample No. 19 | 25 | 0.7 | 0.3 | 27 | 1.0 | 0.6 |
| sample No. 20 | 30 | 0.5 | 0.3 | 36 | 0.8 | 0.4 |
| sample No. 21 | 7 | 0.2 | 0.1 | 7 | 0.2 | 0.1 |
| sample No. 24 | 35 | 0.8 | 0.3 | 40 | 0.8 | 0.4 |
| conventional fused alumina abrasive grains | 10 | 1.2 | 0.4 | 15 | 1.7 | 0.5 |

Resinoid grinding discs using embodiment grains showed about 2.2-1.2 times the grinding ratio of conventional ones.

TABLE 4

| Grinding disc | Total stock removel (g) |
| --- | --- |
| EMBODIMENTS | |
| Sample No. 2 | 581 |
| Sample No. 7 | 549 |
| Sample No. 10 | 590 |
| Sample No. 13 | 581 |
| Sample No. 15 | 585 |
| COMPARATIVE EXAMPLES | |
| Sample No. 19 | 432 |
| Sample No. 20 | 454 |
| Sample No. 21 | 260 |
| Sample No. 24 | 482 |
| conventional alumina zirconia abrasive | 380 |
| conventional fused alumina abrasive | 262 |

EXAMPLE 4

Abrasive grains of particle size #60 were obtained by siftering sample Nos. 2, 7, 10, 13 and 15 in embodiments and sample Nos. 19, 20, 21 and 24 in comparative examples. Endless abrasive belts were obtained in an usual manner using the abrasive grains obtained, conventional fused alumina abrasive grains and alumina zirconia abrasive grains. The results of grinding test are as shown in Table 5. Grinding conditions are as follows.

| belt size: | 100 × 2500 mm | work: | SUS-304 |
| --- | --- | --- | --- |
| belt speed: | 150 m/min. | pressure: | 5 kg |
| time: | 10 min. | | |

Abrasive belts using embodiment grains showed about 2.9-1.1 times grinding ratio of conventional ones.

As apparent from the above disclosure, the present invention can provide a sintered aluminous abrasive grain having dense, uniform and fine crystal structure having a particle size of below one micron and a density of over 95% of theoretical density and having alpha alumina crystallization ratio controlled in the range of 75-95%. As a result the present invention can provide a sintered aluminous abrasive grain having the strength and hardness equal to or higher than conventional abrasive grains, superior grinding properties in grinding resistance and wear resistance and superior self-sharpening property in course of grinding.

Lapping composition, grinding wheel, grinding disc and coated abrasive articles using said abrasive grains also show superior grinding properties.

The producing method requires no spinel components, no alpha alumina seed crystals and no complicated treatment such as vacuum degassing, so that desired sintered aluminous abrasive grains can be produced in an efficient and stable manner.

TABLE 5

| Endless grinding belt | Total stock removel (g) |
| --- | --- |
| EMBODIMENTS | |
| Sample No. 2 | 215 |
| Sample No. 7 | 208 |
| Sample No. 10 | 206 |
| Sample No. 13 | 211 |
| Sample No. 15 | 215 |
| COMPARATIVE EXAMPLES | |
| Sample No. 19 | 162 |
| Sample No. 20 | 158 |
| Sample No. 21 | 80 |
| Sample No. 24 | 176 |
| conventional alumina zirconia abrasive | 120 |
| conventional fused alumina abrasive | 73 |

We claim:

1. Sintered aluminous abrasive grains consisting essentially of aluminum oxide in an amount higher than 98.0 wt % and lithium oxide in an amount of 0.01-1.5 wt %, which aluminous abrasive grains have a density of at least 95% of the theoretical density and an alpha alumina crystal size of less than one micron.

2. Sintered aluminous abrasive grains as claimed in claim 1, wherein the crystallization ratio of the alpha alumina crystal is 75-95%.

3. Sintered aluminous abrasive grains as claimed in claim 1, wherein lithium oxide content is 0.03-1.5 wt % and the alpha alumina crystal size is 0.1-0.5 microns.

4. A method of producing sintered aluminous abrasive grains comprising providing a lithium containing dispersion comprising water, alumina monohydrate, a lithium compound and acid, drying and crushing said lithium containing dispersion and sintering the crushed objects at a temperature of 1100°-1500° C.

5. A method of producing sintered aluminous abrasive grains claimed in claim 4, wherein components for modifying alumina and improving the toughness thereof are added to the dispersion.

6. A method of producing sintered aluminous abrasive grains claimed in claim 4, wherein the dispersion is prepared at 40°–80° C.

7. A method of producing sintered aluminous abrasive grains claimed in claim 4, wherein the dispersion is further subjected to a ultrasonic vibration treatment.

8. A method of producing sintered aluminous abrasive grains claimed in claim 4, wherein acid is nitric acid, hydrochloric acid, acetic acid or mixtures thereof.

9. A method of producing sintered aluminous abrasive grains claimed in claim 5, wherein said modifying component is selected from the group of Mg, Ca, Co, Ni, Cr, Fe, Si, Zn, Mn, Ti and Zr.

10. Grinding wheels containing the sintered aluminous abrasive grains claimed in claim 1 which are bonded with an inorganic bond and sintered.

11. Coated abrasive articles containing the sintered aluminous abrasive grains claimed in claim 1 and which are bonded with an resinoid bond.

12. Grinding wheels containing the sintered aluminous abrasive grains claimed in claim 1 which are bonded with an organic bond and heated at 80°–200° C.

* * * * *